(12) United States Patent
Kar

(10) Patent No.: US 11,176,935 B2
(45) Date of Patent: Nov. 16, 2021

(54) SYSTEM AND METHOD FOR CONTROLLING DEVICES THROUGH VOICE INTERACTION

(71) Applicant: Wipro Limited, Bangalore (IN)

(72) Inventor: Sibsambhu Kar, Bangalore (IN)

(73) Assignee: Wipro Limited, Bangalore (IN)

( * ) Notice: Subject to any disclaimer, the term of this patent is extended or adjusted under 35 U.S.C. 154(b) by 151 days.

(21) Appl. No.: 16/370,940

(22) Filed: Mar. 30, 2019

(65) Prior Publication Data

US 2020/0265836 A1 Aug. 20, 2020

(30) Foreign Application Priority Data

Feb. 15, 2019 (IN) .............................. 201941006073

(51) Int. Cl.
*G10L 25/00* (2013.01)
*G10L 21/00* (2013.01)
(Continued)

(52) U.S. Cl.
CPC .............. *G10L 15/22* (2013.01); *G06F 3/167* (2013.01); *G06N 3/08* (2013.01); *G10L 15/16* (2013.01); *G10L 2015/223* (2013.01)

(58) Field of Classification Search
CPC .......... G06N 20/00; G06N 3/02; G06N 7/005; G06N 3/088; G06N 5/025; G06T 2207/20081; G06T 2207/20084; G06T 7/0004; G06T 11/00; G06T 11/206; G06F 40/30; G06F 17/15; G06F 3/167;
(Continued)

(56) References Cited

U.S. PATENT DOCUMENTS 8,560,325 B2 10/2013 Kanevsky et al.
2013/0297320 A1 11/2013 Buser et al.
(Continued)

FOREIGN PATENT DOCUMENTS

CN 102520789 A 6/2012

OTHER PUBLICATIONS

Paragon Semvox, Retrieved from the Internet: <https://www.semvox.de/en/industries/industry-4-0-automation/>, Mar. 20, 2019, 7 pages.
(Continued)

*Primary Examiner* — Michael Ortiz-Sanchez
(74) *Attorney, Agent, or Firm* — Finnegan, Henderson, Farabow, Garrett & Dunner, LLP

(57) ABSTRACT

A method and a system for controlling devices through voice interaction are disclosed. In an embodiment, the method may include identifying at least one feature of a target device and an action to be performed on the at least one feature, based on an intent and an object determined from a voice input received from a user. The method may further include determining a correspondence between the at least one feature and the action to be performed using a trained neural network. The method may further include comparing a current operational state of the at least one feature with an operational threshold of the at least one feature. The method may further include performing the action on the at least one feature based on the determined correspondence, when the current operational state is within limits of the operational threshold.

18 Claims, 5 Drawing Sheets

(51) Int. Cl.
*G10L 15/22* (2006.01)
*G10L 15/16* (2006.01)
*G06N 3/08* (2006.01)
*G06F 3/16* (2006.01)

(58) Field of Classification Search
CPC ............... G06F 16/90332; G06F 40/40; G06F 16/24575; G06F 16/3322; G06F 16/3344; G06F 9/453; G06F 11/0709; G06F 11/0751; G06F 11/079; G06F 11/0793; G06F 16/43; G06F 16/53; G06F 16/583; G06F 16/9032; G06F 40/20; G06F 40/284; G06F 40/295; G06F 8/38; G10L 15/22; G10L 15/26; G10L 15/16; G10L 15/18; G10L 15/20; G10L 2015/223; G10L 2015/226; G10L 2015/228; G10L 15/1815; G10L 15/063; G10L 15/144; G10L 15/30; G10L 2015/088; G10L 2015/221; G10L 2015/225; G06K 9/00288; G06K 9/00671; G06K 9/3233; G06K 9/46; G06K 9/6267; H04M 2203/355; H04M 3/4936

See application file for complete search history.

(56) References Cited

U.S. PATENT DOCUMENTS

| | | | |
|---|---|---|---|
| 2014/0156281 A1 | 6/2014 | Boyd et al. | |
| 2018/0053504 A1 | 2/2018 | Wang et al. | |
| 2018/0329512 A1* | 11/2018 | Liao | G06F 3/167 |
| 2019/0057683 A1* | 2/2019 | Sak | G10L 15/22 |
| 2019/0228269 A1* | 7/2019 | Brent | G06K 9/627 |
| 2019/0311070 A1* | 10/2019 | Huang | G06K 9/3241 |
| 2019/0325068 A1* | 10/2019 | Lai | G06N 3/08 |
| 2019/0340202 A1* | 11/2019 | Kandur Raja | G06F 40/30 |

OTHER PUBLICATIONS

"Zhang", "Intent Recognition in Smart Living Through Deep Recurrent Neural Networks", Aug. 16, 2017, 11 pages, Retrieved on the Internet:<https://arxiv.org/pdf/1702.06830.pdf>.

* cited by examiner

SYSTEM AND METHOD FOR CONTROLLING DEVICES THROUGH VOICE INTERACTION This application claims the benefit of Indian Patent Application Serial No. 201941006073, filed Feb. 15, 2019, which is hereby incorporated by reference in its entirety.

FIELD

This disclosure relates generally to controlling devices, and more particularly to a method and a device for controlling devices through voice interaction.

BACKGROUND

Various manufacturing and production facilities and other industrial processes may involve usage of heavy machinery. For example, the heavy machinery may include, among others, machinery and components of the machinery used for mining, drilling, and on-board oil rigs and ships. It is generally observed that maintenance of the machinery can be a costly and a time consuming activity. Further, owing to bulkiness of the machinery, it may be difficult to reach to the machinery and the components of the machinery, where some operation or repair activity has to be carried out. In such scenarios, a remote operation or control may be used. However, such remote operation or control may include providing a physical system at the remote place, and operating the physical system using a physical mechanism, with the help of one or more personnel. This increases cost in the form of additional system, space and manpower.

Some automated operation and control mechanisms may address the above problem partially. However, these automated operation and control mechanisms also require trained or highly skilled personnel. There is, therefore, no mechanism for performing control, management and maintenance of the heavy machinery in an efficient and cost-effective manner.

SUMMARY

In one embodiment, a method for controlling devices through voice interaction in disclosed. The method may include identifying at least one feature of a target device and an action to be performed on the at least one feature, based on an intent and an object determined from a voice input received from a user. The method may further include determining a correspondence between the at least one feature and the action to be performed using a trained neural network. The trained neural network may be pre-trained based on correspondence between a plurality of prior-actions performed by the user and a plurality of features associated with the target device. The method may further include comparing a current operational state of the at least one feature with an operational threshold of the at least one feature, and performing the action on the at least one feature based on the determined correspondence, when the current operational state is within limits of the operational threshold.

In another embodiment, a controlling device for controlling devices through voice interaction in disclosed. The controlling device includes a processor and a memory communicatively coupled to the processor. The memory stores processor instructions, which, on execution, cause the processor to identify at least one feature of a target device and an action to be performed on the at least one feature, based on an intent and an object determined from a voice input received from a user. The processor instructions further cause the processor to determine a correspondence between the at least one feature and the action to be performed using a trained neural network, wherein the trained neural network is pre-trained based on correspondence between a plurality of prior-actions performed by the user and a plurality of features associated with the target device. The processor instructions further cause the processor to compare a current operational state of the at least one feature with an operational threshold of the at least one feature. The processor instructions further cause the processor to perform the action on the at least one feature based on the determined correspondence, when the current operational state is within limits of the operational threshold.

In yet another embodiment, a non-transitory computer-readable storage medium is disclosed. The non-transitory computer-readable storage medium has instructions stored thereon, a set of computer-executable instructions causing a computer comprising one or more processors to perform steps comprising identifying at least one feature of a target device and an action to be performed on the at least one feature, based on an intent and an object determined from a voice input received from a user; determining a correspondence between the at least one feature and the action to be performed using a trained neural network; comparing, by the controlling device, a current operational state of the at least one feature with an operational threshold of the at least one feature; and performing the action on the at least one feature based on the determined correspondence, when the current operational state is within limits of the operational threshold.

It is to be understood that both the foregoing general description and the following detailed description are exemplary and explanatory only and are not restrictive of the invention, as claimed.

BRIEF DESCRIPTION OF THE DRAWINGS

The accompanying drawings, which are incorporated in and constitute a part of this disclosure, illustrate exemplary embodiments and, together with the description, serve to explain the disclosed principles.

DETAILED DESCRIPTION

Exemplary embodiments are described with reference to the accompanying drawings. Wherever convenient, the same reference numbers are used throughout the drawings to refer to the same or like parts. While examples and features of disclosed principles are described herein, modifications, adaptations, and other implementations are possible without departing from the spirit and scope of the disclosed embodiments. It is intended that the following detailed description be considered as exemplary only, with the true scope and spirit being indicated by the following claims. Additional illustrative embodiments are listed below.

Figure 1:
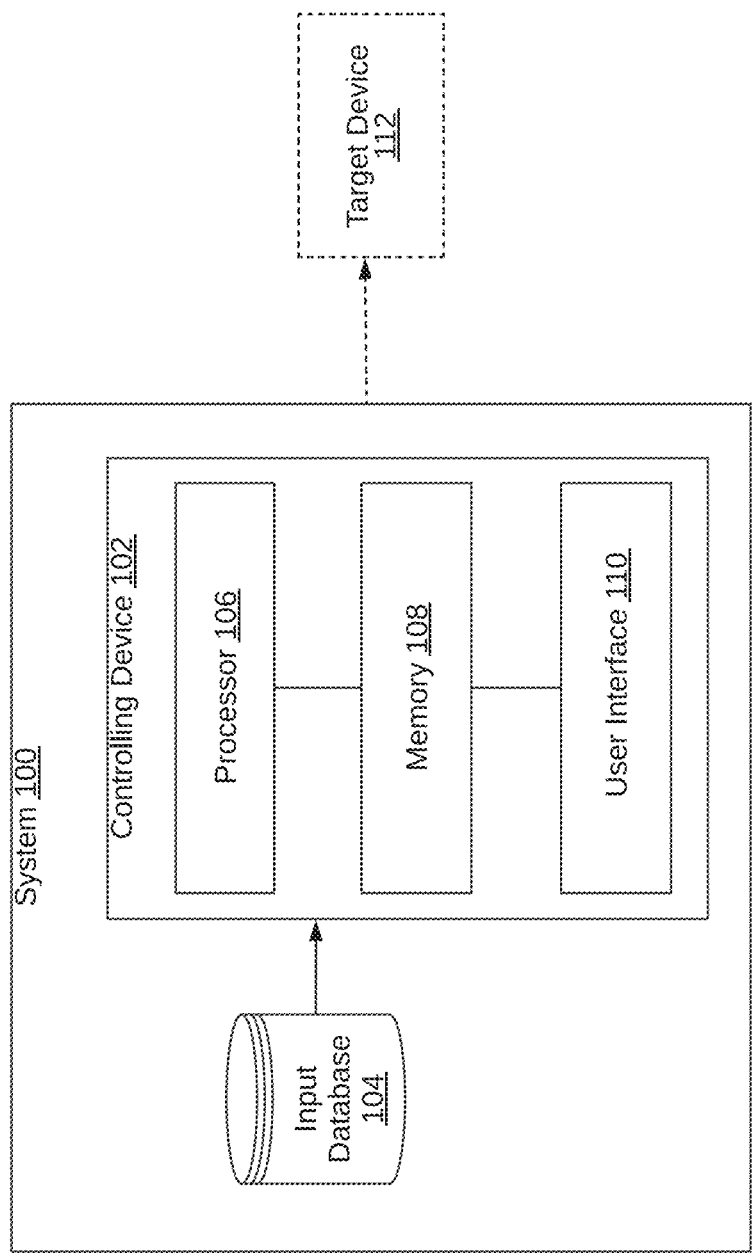
FIG. 1 is a block diagram illustrating a system for controlling devices through voice interaction, in accordance with an embodiment.

In one embodiment, a system 100 for controlling devices through voice interaction is illustrated in the FIG. 1, in accordance with an embodiment. The system 100 may include a controlling device 102 and an input database 104. The controlling device 102 may be a computing device having voice processing capability. Examples of the controlling device 102 may include, but are not limited to, a server, desktop, laptop, notebook, netbook, tablet, smartphone, mobile phone, application server, sever, or the like.

The controlling device 102 may control devices through voice interaction. By way of an example, the controlling device 102 may control machinery and components of the machinery in a manufacturing facility, through voice interaction. The controlling device 102 may receive input data voice input and images associated with a target device from the input database 104. To this end, the controlling device 102 may be communicatively coupled to the input database 104. Further, in some embodiments, the controlling device 102 may be communicatively coupled to a target device 112 which is to be controlled. By way of an example, the input database 104 may include a Relational Database Management System (RDBMS) from which structured data may be extracted. By way of another example, the input database 104 may include website data, machine generated data, and word documents from which unstructured data may extracted.

As will be described in greater detail in conjunction with FIG. 2 to FIG. 4, in order to control the devices through voice interaction, the controlling device 102 may identify at least one feature of a target device and an action to be performed on the at least one feature, based on an intent and an object determined from a voice input received from a user. The controlling device 102 may further determine a correspondence between the at least one feature and the action to be performed using a trained neural network. The controlling device 102 may further compare a current operational state of the at least one feature with an operational threshold of the at least one feature. The controlling device 102 may further perform the action on the at least one feature based on the determined correspondence, when the current operational state is within limits of the operational threshold.

In order to perform the above discussed functionalities, the controlling device 102 may include a processor 106 and a memory 108. The memory 108 may store instructions that, when executed by the processor 106, cause the processor 106 to control devices through voice interaction, as discussed in greater detail in FIG. 2 to FIG. 4. The memory 108 may be a non-volatile memory or a volatile memory. Examples of non-volatile memory, may include, but are not limited to a flash memory, a Read Only Memory (ROM), a Programmable ROM (PROM), Erasable PROM (EPROM), and Electrically EPROM (EEPROM) memory. Examples of volatile memory may include, but are not limited to Dynamic Random Access Memory (DRAM), and Static Random-Access memory (SRAM). The memory 108 may also store various data (e.g., input data, voice data, text data, image data, neural network, feature data, intent and object data, current operational state data, threshold data, training data, etc.) that may be captured, processed, and/or required by the system 100.

The controlling device 102 may further include a user interface 110 through which the controlling device 102 may interact with a user and vice versa. By way of an example, the user interface 110 may be used to display results of analysis performed by the controlling device 102 to the user. By way of another example, the user interface 110 may be used by the user to provide inputs to the controlling device 102.

The system 100 may interact with one or more external devices (not shown in FIG. 1) over a communication network (not shown in FIG. 1) for sending or receiving various data. Examples of the one or more external devices may include, but are not limited to a remote server, a digital device, or another computing system. The communication network may be a wired or a wireless network and the examples may include, but are not limited to the Internet, Wireless Local Area Network (WLAN), Wi-Fi, Long Term Evolution (LTE), Worldwide Interoperability for Microwave Access (WiMAX), and General Packet Radio Service (GPRS).

Figure 2:
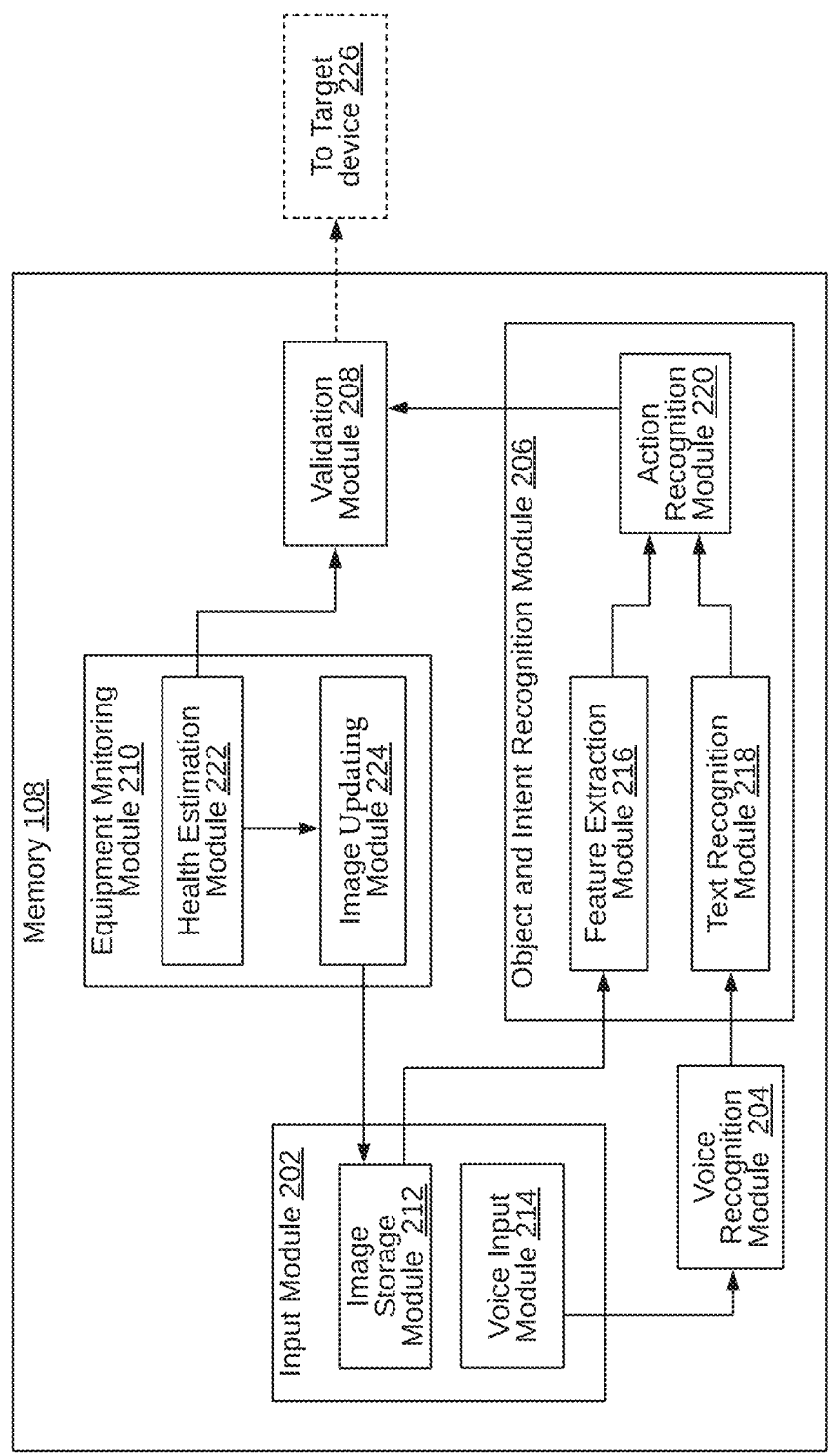
FIG. 2 illustrates a block diagram of a memory of a controlling device for controlling devices through voice interaction, in accordance with an embodiment.

Referring now to FIG. 2, a functional block diagram of the memory 108 within the controlling device 102 configured to control devices through voice interaction is illustrated, in accordance with an embodiment. The memory 108 may include modules that may perform various functions so as to control devices through voice interaction. The memory 108 may include an input module 202, a voice recognition module 204, an object and intent recognition module 206, a validation module 208, and an equipment monitoring module 210. As will be appreciated by those skilled in the art, all such aforementioned modules and databases 202-210 may be represented as a single module or a combination of different modules. Moreover, as will be appreciated by those skilled in the art, each of the modules and databases 202-210 may reside, in whole or in parts, on one device or multiple devices in communication with each other.

The input module 202 may receive one or more input. In some embodiments, the input module 202 may further include an image storage module 212 and a voice input module 214. In some embodiments, the image storage module 212 may store images, such as blueprints or drawings or layouts or diagrams associated with a target device. As mentioned earlier, the target device may include machinery or components of the machinery, in a manufacturing facility. The target device may be mapped to one or more associated images. Further, in some embodiments, when there any changes in the state of the target device, the images associated with the target device may be updated based on such changes. In some embodiments, the updated images may be input to the feature extraction module 216. When there is no updating, i.e. no changes in the state of the target device, the original images may be input to the feature extraction module 216.

The voice input module 214 may receive voice input received from a user. It may be noted that the voice input received from the user may include user commands. In some embodiments, the voice input module 214 may be communicatively coupled to one or more voice capturing components, such as microphones, or any other type of voice capturing components. The voice recognition module 204 may receive the voice input from the voice input module 214, and may convert the voice input into text. It may be noted that the voice recognition module 204 may convert the voice input data into text using any known technique.

The object and intent recognition module 206 may receive the text from the voice recognition module 204. The object and intent recognition module 206 may determine an intent and an object of the user, based on the text. The object and intent recognition module 206 may further determine an action the user may require to perform in relation to the target device. The object and intent recognition module 206 may further determine a device (i.e. machinery and or the components of the machinery) for performing the determined action. In some embodiments, the object and intent recognition module 206 may use deep learning model, such as a Long Short Term Memory (LSTM) model for determining each of the intent and the object of the user. The object and intent recognition module 206 may further receive the images associated with the target device (for example, a blueprint, or a drawing, or a diagram of the machinery or components of the machinery) from image storage module 212. Based on the identified object and intent of the user, a control instruction may be generated for the target device to be controlled.

In some embodiments, object and intent recognition module 206 may further include the feature extraction module 216, a text recognition module 218, and an action recognition module 220. The feature extraction module 216 may extract features from the images associated with the target device. In some embodiments, the feature extraction module 216 may extract the features using a Convolutional Neural Network (CNN) model. The CNN model may be pre-trained with training data. For example, the CNN model may be pre-trained based on correspondence between a plurality of prior-actions performed by the user and a plurality of features associated with the target device. The CNN module is further explained in conjunction with FIG. 3.

Figure 3:
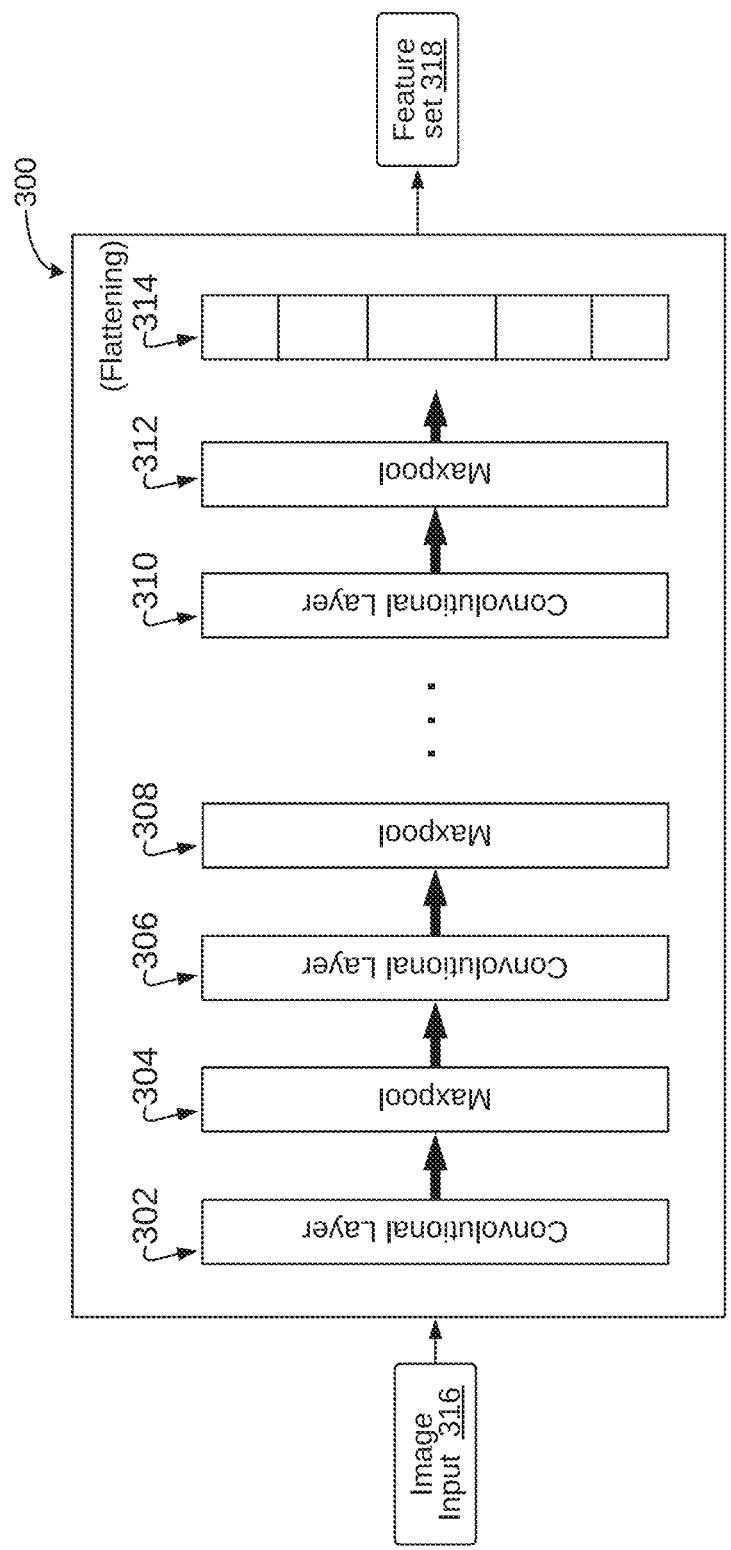
FIG. 3 illustrates an exemplary Convolution Neural Network (CNN) model for controlling devices, in accordance with an embodiment.

Referring now to FIG. 3, an exemplary Convolutional Neural Network (CNN) model 300 is illustrated, in accordance with an embodiment. The CNN model 300 may include multiple convolution layers (for example, layer 302, layer 306, layer 310, etc.). Each layer may contain multiple filters for convolution followed by max-pooling (for example, 304, 308, 312, etc.). As will be appreciated by those skilled in that art, during training of the CNN model 300, each filter at each layer may learn different patches, and the filters across various layers may learn patches at different scales. The output at a final convolution layer may be flattened and may be connected to one or more fully connected layer for decision making. Once the CNN model 300 is trained, the CNN model 300 may receive image input 316 (for example, a drawing) as input, and may generate a feature set 318 as an output at the flattened layer 314. Further, during training, each convolution filter may be trained to learn different features from the input images. For example, at an initial convolution layer, some filters may learn horizontal edges, some may learn curved edges, some may learn uniform region, and so on. At higher convolution layer, filters may learn to match larger pattern, such as the outline of an object, texture of the object, and so on. As a result, when the image input 316 is received as an input during feature extraction, each pre-trained filter may generate activation based on matching pattern in the image. It may be noted that highest activations may be extracted through max-pooling, and may be made available at flattened layer as features.

Referring back to FIG. 2, the text recognition module 218 may receive the text from the voice input module 214, and may process the text. In some embodiments, the text recognition module 218 may use Long Short Term Memory (LSTM) model for processing of the text. The text may be provided to the LSTM model in the form of sequence of words, using word embedding. The LSTM model may be further pre-trained with examples of actions that the user intends to perform frequently. The output of the LSTM module may be in form of a set of probabilities indicating various intents.

The action recognition module 220 may receive the features extracted by the feature extraction module 216, and the set of probabilities computed by the text recognition module 218. The inputs from the action recognition module 220 and the text recognition module 218 may be trained together in a neural network. Based on the training, a correspondence may be determined between the features and the action to be performed using the trained neural network. The trained neural network may be pre-trained based on correspondence between a plurality of prior-actions performed by the user and a plurality of features associated with the target e device.

In some embodiments, two different loss functions may be used for training—one for recognition of the action and another for recognition of the target device that is to perform the action. These two loss functions may be combined during training. As both action and the device on which the action is to be performed or which is to perform the action are known during training, the loss may be minimized when both the action and the device are correctly classified. This may help in reducing any ambiguity caused due to error in voice data to text data conversion. By way of an example, the voice input module 214 receives a voice input: "Increase furnace temperature". However, the corresponding text data generated by the voice input module 214 is "Increase for mess temperature". Since the voice input module 214 has identified the action "increase temperature" correctly, it will be able to prioritize "furnace" based on past association. Once the device and the action to be performed is identified correctly, the action recognition module 220 may generate control instructions for the controlling the target device.

The validation module 208 may perform validation of the control instructions generated by the action recognition module 220. The validation module 208 may further receive health status of the target device from the equipment monitoring module 210. The received control instructions may be mapped against the input received from the equipment monitoring module 210 to determine if the control instructions are executable. If the received control instructions are non-executable, user may be informed about the same, for example, by way of an alert notification. If the control instructions are executable, the control instructions may be provided to a target device 226 for performing the action requested.

The equipment monitoring module 210 may monitor health of the target device and provide real-time information about the current state of the target device. The real-time information may include minimum operational requirement, maximum operational efficiency, optimal running state of the target device and any other parameters that are essential to the efficient working of the target device. In case of any issue with the operation of the target device, the user may be alerted and images associated with the target device may be updated. The equipment monitoring module 210 may further include a health estimation module 222 and an image updating module 224.

The health estimation module 222 may continuously monitor the target device and may determine the current operational state of the target device against the expected operational state of the target device. The target device may be attached to an additional image to indicate the health and current state of the target device. In case of any discrepancy in the operation of the target device, update information may be provided to the image updating module 224 to update the image associated with the target device.

The image updating module 224 may receive the update information from the health estimation module 222, and may update the images (blueprints, drawings, layouts, etc.) associated with the target device, according to the update information received. In some embodiments, the update may be performed in an automated way, using interactive drawing tools to indicate the present state and health of the target device. The image updating module 224 may further alert the user about the update of the image associated to the target device.

Figure 4:
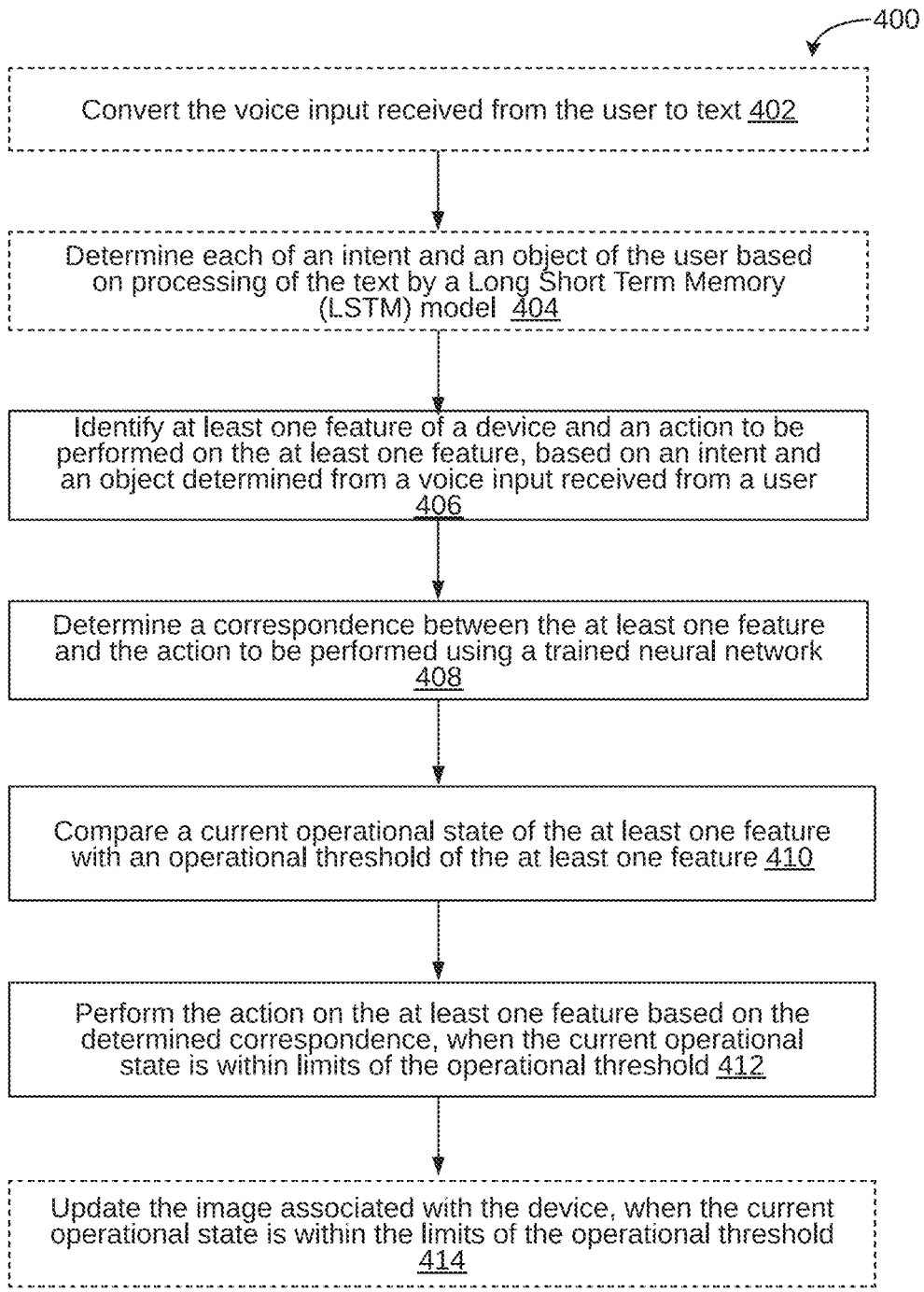
FIG. 4 illustrates a flowchart of a method for controlling devices through voice interaction, in accordance with an embodiment.

Referring now to FIG. 4, a flowchart 400 of a method for controlling devices through voice interaction is illustrated, in accordance with an embodiment. In some embodiments, the devices may include machinery and components of the machinery in a manufacturing facility.

At step 406, at least one feature of a target device and an action to be performed on the at least one feature may be identified, based on an intent and an object determined from a voice input received from a user. At step 408, a correspondence may be determined between the at least one feature and the action to be performed. At step 410, a current operational state of the at least one feature may be compared with an operational threshold of the at least one feature. At step 412, the action may be performed on the at least one feature based on the determined correspondence, when the current operational state is within limits of the operational threshold. Additionally, at step 402, the voice input received from the user may be converted to text 402. At step 404, each of an intent and an object of the user may be determined. At step 414, the image associated with the device may be updated, when the current operational state is within the limits of the operational threshold.

At step 402, the voice input may be received from the user, and converted into text. The voice input may include voice input, such as user commands, received from a user. Once the voice input is received, voice input may be converted into text. At step 404, each of an intent and an object of the user may be determined based on processing of the text by a Long Short Term Memory (LSTM) model. Upon identifying the object and intent of the user, a control instruction may be generated for the device to be controlled. In some embodiments, the text may be provided to the LSTM model in the form of sequence of words using word embedding. Further, in some embodiments, the LSTM model may be trained based on the plurality of prior actions performed by the user. It may be noted that each of the plurality of prior actions may be associated with a probability of execution by the user.

At step 406, at least one feature of the target device and an action to be performed on the at least one feature may be identified, based on an intent and an object determined from a voice input received from a user. As already mentioned, the target device may include machinery and components of the machinery in manufacturing facility. By way of an example, the features of a device and an action to be performed may be to increase furnace temperature.

In some embodiments, the at least one feature of the device may be identified from images, by using a convoluting neural network (CNN). The CNN may be trained to identify the features of the target device using at least one training image associated with the target device. In some embodiments, the image may include one or more of a blueprint of the device, a drawing of the device, or a layout of the device. The operation of the CNN is already explained above in conjunction with FIGS. 2 and 3.

At step 408, a correspondence may be determined between the at least one feature and the action to be performed using a trained neural network. The trained neural network may be pre-trained based on correspondence between a plurality of prior-actions performed by the user and a plurality of features associated with the device. For example, the neural network may be trained to learn the correspondence between the feature of the target device and an action to be performed by the user. It may be noted that for correct identification of the feature and the action, two loss functions may be combined during training. Since both the feature and the action are known during training, the loss is minimized when both action and objects are correctly classified. Once the feature and the action are identified correctly, requisite control instructions may be generated to accomplish the action.

At step 410, a current operational state of the at least one feature may be compared with an operational threshold of the at least one feature. In some embodiments, the current operational state of the at least one feature may correspond to the health status of the target device. Further, the current operational state may be determined based on continuous monitoring of the target device. For example, the target device may be provided with an additional image that indicates the current operational state of the features of the target device.

At step 412, the action may be performed on the at least one feature based on the determined correspondence, when the current operational state is within limits of the operational threshold. By way of an example, once the requisite control instructions are generated to accomplish the action, the control instructions may be validated for determining the executability of the generated control instruction, based on the current operational state.

If the current operational state is within limits of the operational threshold (i.e. the target device is capable of performing an action), a trigger may be generated for executing the action. However, when the current operational state is outside the limits of the operational threshold, a non-performance of the action on the at least one feature may be established. Accordingly, an alert may be sent to a user regarding non-performance of the action. In some embodiments, the alert may include details associated with the non-performance of the action.

At step 414, an image associated with a device may be updated, when a current operational state is within the limits of the operational threshold. In other words, the blueprints, or drawings, or layouts associated with the target image may be updated based on the health status information of the target device. The update may be carried out based on the changes that are observed in the additional images associated with target device that indicate the current state of the target device. Additionally, a user may be alerted about the update to the images associated with the target device.

As will be also appreciated, the above described techniques may take the form of computer or controller implemented processes and apparatuses for practicing those processes. The disclosure can also be embodied in the form of computer program code containing instructions embodied in tangible media, such as floppy diskettes, solid state drives, CD-ROMs, hard drives, or any other computer-readable storage medium, wherein, when the computer program code is loaded into and executed by a computer or controller, the computer becomes an apparatus for practicing the technology. The disclosure may also be embodied in the form of computer program code or signal, for example, whether stored in a storage medium, loaded into and/or executed by a computer or controller, or transmitted over some transmission medium, such as over electrical wiring or cabling, through fiber optics, or via electromagnetic radiation, wherein, when the computer program code is loaded into and executed by a computer, the computer becomes an apparatus for practicing the technology. When implemented on a general-purpose microprocessor, the computer program code segments configure the microprocessor to create specific logic circuits.

Figure 5:
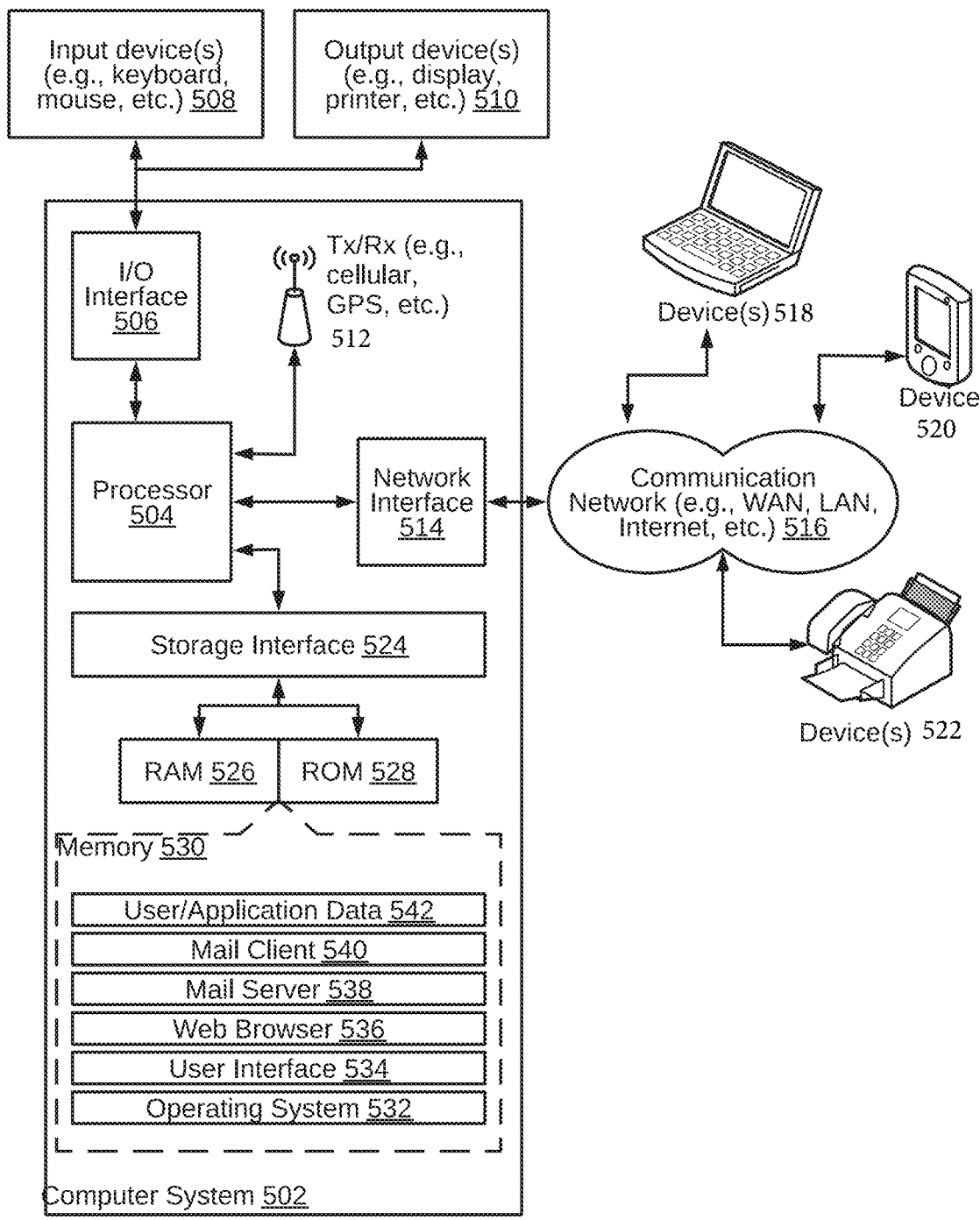
FIG. 5 illustrates a block diagram of an exemplary computer system for implementing embodiments consistent with the present disclosure.

The disclosed methods and systems may be implemented on a conventional or a general-purpose computer system, such as a personal computer (PC) or server computer. Referring now to FIG. 5, a block diagram of an exemplary computer system 502 for implementing various embodiments is illustrated. Computer system 602 may include a central processing unit ("CPU" or "processor") 604. Processor 504 may include at least one data processor for executing program components for executing user or system-generated requests. A user may include a person, a person using a device such as such as those included in this disclosure, or such a device itself. Processor 504 may include specialized processing units such as integrated system (bus) controllers, memory management control units, floating point units, graphics processing units, digital signal processing units, etc. Processor 504 may include a microprocessor, such as AMD® ATHLON® microprocessor, DURON® microprocessor OR OPTERON® microprocessor, ARM's application, embedded or secure processors, IBM® POWERPC®, INTEL'S CORE® processor, ITANIUM® processor, XEON® processor, CELERON® processor or other line of processors, etc. Processor 504 may be implemented using mainframe, distributed processor, multi-core, parallel, grid, or other architectures. Some embodiments may utilize embedded technologies like application-specific integrated circuits (ASICs), digital signal processors (DSPs), Field Programmable Gate Arrays (FPGAs), etc.

Processor 504 may be disposed in communication with one or more input/output (I/O) devices via an I/O interface 506. I/O interface 506 may employ communication protocols/methods such as, without limitation, audio, analog, digital, monoaural, RCA, stereo, IEEE-1394, serial bus, universal serial bus (USB), infrared, PS/2, BNC, coaxial, component, composite, digital visual interface (DVI), high-definition multimedia interface (HDMI), RF antennas, S-Video, VGA, IEEE 802.n/b/g/n/x, Bluetooth, cellular (for example, code-division multiple access (CDMA), high-speed packet access (HSPA+), global system for mobile communications (GSM), long-term evolution (LTE), WiMax, or the like), etc.

Using I/O interface 506, computer system 502 may communicate with one or more I/O devices. For example, an input device 508 may be an antenna, keyboard, mouse, joystick, (infrared) remote control, camera, card reader, fax machine, dongle, biometric reader, microphone, touch screen, touchpad, trackball, sensor (for example, accelerometer, light sensor, GPS, gyroscope, proximity sensor, or the like), stylus, scanner, storage device, transceiver, video device/source, visors, etc. An output device 510 may be a printer, fax machine, video display (for example, cathode ray tube (CRT), liquid crystal display (LCD), light-emitting diode (LED), plasma, or the like), audio speaker, etc. In some embodiments, a transceiver 512 may be disposed in connection with processor 504. Transceiver 512 may facilitate various types of wireless transmission or reception. For example, transceiver 512 may include an antenna operatively connected to a transceiver chip (for example, TEXAS® INSTRUMENTS WILINK WL1286® transceiver, BROADCOM® BCM4550IUB8® transceiver, INFINEON TECHNOLOGIES® X-GOLD 618-PMB9800® transceiver, or the like), providing IEEE 802.6a/b/g/n, Bluetooth, FM, global positioning system (GPS), 2G/3G HSDPA/HSUPA communications, etc.

In some embodiments, processor 504 may be disposed in communication with a communication network 514 via a network interface 516. Network interface 516 may communicate with communication network 514. Network interface 516 may employ connection protocols including, without limitation, direct connect, Ethernet (for example, twisted pair 50/500/5000 Base T), transmission control protocol/internet protocol (TCP/IP), token ring, IEEE 802.11a/b/g/n/x, etc. Communication network 514 may include, without limitation, a direct interconnection, local area network (LAN), wide area network (WAN), wireless network (for example, using Wireless Application Protocol), the Internet, etc. Using network interface 516 and communication network 514, computer system 502 may communicate with devices 518, 520, and 522. These devices may include, without limitation, personal computer(s), server(s), fax machines, printers, scanners, various mobile devices such as cellular telephones, smartphones (for example, APPLE® IPHONE® smartphone, BLACKBERRY® smartphone, ANDROID® based phones, etc.), tablet computers, eBook readers (AMAZON® KINDLE® ereader, NOOK® tablet computer, etc.), laptop computers, notebooks, gaming consoles (MICROSOFT® XBOX® gaming console, NINTENDO® DS® gaming console, SONY® PLAYSTATION® gaming console, etc.), or the like. In some embodiments, computer system 502 may itself embody one or more of these devices.

In some embodiments, processor 504 may be disposed in communication with one or more memory devices (for example, RAM 526, ROM 528, etc.) via a storage interface 524. Storage interface 524 may connect to memory 530 including, without limitation, memory drives, removable disc drives, etc., employing connection protocols such as serial advanced technology attachment (SATA), integrated drive electronics (IDE), IEEE-1394, universal serial bus (USB), fiber channel, small computer systems interface (SCSI), etc. The memory drives may further include a drum, magnetic disc drive, magneto-optical drive, optical drive, redundant array of independent discs (RAID), solid-state memory devices, solid-state drives, etc.

Memory 530 may store a collection of program or database components, including, without limitation, an operating system 532, user interface application 534, web browser 536, mail server 538, mail client 540, user/application data 542 (for example, any data variables or data records discussed in this disclosure), etc. Operating system 532 may facilitate resource management and operation of computer system 502. Examples of operating systems 532 include, without limitation, APPLE® MACINTOSH® OS X platform, UNIX platform, Unix-like system distributions (for example, Berkeley Software Distribution (BSD), FreeBSD, NetBSD, OpenBSD, etc.), LINUX distributions (for example, RED HAT®, UBUNTU®, KUBUNTU®, etc.), IBM® OS/2 platform, MICROSOFT® WINDOWS® platform (XP, Vista/7/8, etc.), APPLE® IOS® platform, GOOGLE® ANDROID® platform, BLACKBERRY® OS platform, or the like. User interface 534 may facilitate display, execution, interaction, manipulation, or operation of program components through textual or graphical facilities. For example, user interfaces may provide computer inter-action interface elements on a display system operatively connected to computer system 502, such as cursors, icons, check boxes, menus, scrollers, windows, widgets, etc. Graphical user interfaces (GUIs) may be employed, including, without limitation, APPLE® Macintosh® operating systems' AQUA® platform, IBM® OS/2® platform, MICROSOFT® WINDOWS® platform (for example, AERO® platform, METRO® platform, etc.), UNIX X-WINDOWS, web interface libraries (for example, ACTIVEX® platform, JAVA® programming language, JAVASCRIPT® programming language, AJAX® programming language, HTML, ADOBE® FLASH® platform, etc.), or the like.

In some embodiments, computer system 502 may implement a web browser 536 stored program component. Web browser 536 may be a hypertext viewing application, such as MICROSOFT® INTERNET EXPLORER® web browser, GOOGLE® CHROME® web browser, MOZILLA® FIREFOX® web browser, APPLE® SAFARI® web browser, etc. Secure web browsing may be provided using HTTPS (secure hypertext transport protocol), secure sockets layer (SSL), Transport Layer Security (TLS), etc. Web browsers may utilize facilities such as AJAX, DHTML, ADOBE® FLASH® platform, JAVASCRIPT® programming language, JAVA® programming language, application programming interfaces (APis), etc. In some embodiments, computer system 502 may implement a mail server 538 stored program component. Mail server 538 may be an Internet mail server such as MICROSOFT® EXCHANGE® mail server, or the like. Mail server 538 may utilize facilities such as ASP, ActiveX, ANSI C++/C #, MICROSOFT .NET® programming language, CGI scripts, JAVA® programming language, JAVASCRIPT® programming language, PERL® programming language, PHP® programming language, PYTHON® programming language, WebObjects, etc. Mail server 538 may utilize communication protocols such as internet message access protocol (IMAP), messaging application programming interface (MAPI), Microsoft Exchange, post office protocol (POP), simple mail transfer protocol (SMTP), or the like. In some embodiments, computer system 502 may implement a mail client 540 stored program component. Mail client 540 may be a mail viewing application, such as APPLE MAIL® mail client, MICROSOFT ENTOURAGE® mail client, MICROSOFT OUTLOOK® mail client, MOZILLA THUNDERBIRD® mail client, etc.

In some embodiments, computer system 502 may store user/application data 542, such as the data, variables, records, etc. as described in this disclosure. Such databases may be implemented as fault-tolerant, relational, scalable, secure databases such as ORACLE® database OR SYBASE® database. Alternatively, such databases may be implemented using standardized data structures, such as an array, hash, linked list, struct, structured text file (for example, XML), table, or as object-oriented databases (for example, using OBJECTSTORE® object database, POET® object database, ZOPE® object database, etc.). Such databases may be consolidated or distributed, sometimes among the various computer systems discussed above in this disclosure. It is to be understood that the structure and operation of the any computer or database component may be combined, consolidated, or distributed in any working combination.

It will be appreciated that, for clarity purposes, the above description has described embodiments of this technology with reference to different functional units and processors. However, it will be apparent that any suitable distribution of functionality between different functional units, processors or domains may be used without detracting from the invention. For example, functionality illustrated to be performed by separate processors or controllers may be performed by the same processor or controller. Hence, references to specific functional units are only to be seen as references to suitable means for providing the described functionality, rather than indicative of a strict logical or physical structure or organization.

As will be appreciated by those skilled in the art, the techniques described in the various embodiments discussed above pertain to controlling devices through voice interaction. The techniques map the devices to their associated images, which is then used to control the target device. The techniques further provide for converting voice commands into text, using a neural network such as Long Short-Term Memory (LSTM) to generate probabilities of requested action, and then using the text for providing control instructions to the target devices. The techniques further provide for extracting features from the images using neural network, such as a Convolutional Neural Network (CNN).

The above techniques, therefore, provide for an easy and economical way of monitoring and controlling devices (such as heavy machinery) through simple voice command and using existing images of the devices. The techniques may be used for automatic mapping of the devices with their associated images. Further, the techniques provide for monitoring health of the devices and causing the device to execute an action, upon taking into consideration the health of the devices. As a result, incorrect machinery operation is avoided.

Furthermore, one or more computer-readable storage media may be utilized in implementing embodiments consistent with the present disclosure. A computer-readable storage medium refers to any type of physical memory on which information or data readable by a processor may be stored. Thus, a computer-readable storage medium may store instructions for execution by one or more processors, including instructions for causing the processor(s) to perform steps or stages consistent with the embodiments described herein. The term "computer-readable medium" should be understood to include tangible items and exclude carrier waves and transient signals, i.e., be non-transitory. Examples include random access memory (RAM), read-only memory (ROM), volatile memory, nonvolatile memory, hard drives, CD ROMs, DVDs, flash drives, disks, and any other known physical storage media.

It is intended that the disclosure and examples be considered as exemplary only, with a true scope and spirit of disclosed embodiments being indicated by the following claims.

What is claimed is:

1. A method for controlling devices through voice interaction, the method comprises:
   receiving, by a controlling device, a voice input and one or more image inputs associated with a target device;
   identifying, by the controlling device, at least one feature of the target device and an action to be performed on the at least one feature, based on an intent and an object determined from the received voice input and the one or more image inputs;
   determining, by the controlling device, a correspondence between the at least one feature and the action to be performed using a trained neural network, wherein the trained neural network is pre-trained based on a correspondence between a plurality of prior actions and a plurality of features associated with the target device, and wherein the trained neural network is pre-trained to correctly identify the at least one feature and the action by combining a loss function for recognition of the action and a loss function for recognition of the target device that is to perform the action;

comparing, by the controlling device, a current operational state of the at least one feature with an operational threshold of the at least one feature, wherein the current operational state of the at least one feature is indicative of a health state of the target device;

when there is a variation in the health state of the target device,
updating, by the controlling device, the one or more image inputs associated with the target device based on the variation,
identifying, by the controlling device, an updated at least one feature of the target device based on the updated one or more image inputs, and
determining, by the controlling device, a correspondence between the updated at least one feature and the action to be performed using a trained neural network; and performing, by the controlling device, the action on the at least one feature or the updated at least one feature based on the determined correspondence, when the current operational state is within limits of the operational threshold.

2. The method of claim 1 further comprises:
converting, by the controlling device, the received voice input to text; and
determining, by the controlling device, each of the intent and the object based on processing of the text by a Long Short Term Memory (LSTM) model.

3. The method of claim 2, wherein the text is provided to the LSTM model in the form of sequence of words using word embeddings and the LSTM model is trained based on the prior actions, and each of the prior actions is associated with a probability of execution.

4. The method of claim 1 further comprises determining, by the controlling device, from the one or more image inputs associated with the target device, and by a convoluting neural network (CNN), the at least one feature of the target device, wherein the CNN is trained to identify features from the target device using at least one training image associated with the target device.

5. The method of claim 4, wherein the one or more image inputs comprises at least one of a blueprint of the target device, a drawing of the target device, or a layout of the target device.

6. The method of claim 1 further comprises:
establishing, by the controlling device, non-performance of the action on the at least one feature or the updated at least one feature, when the current operational state is outside the limits of the operational threshold; and
outputting, by the controlling device, an alert regarding the non-performance of the action, wherein the alert comprises details associated with the non-performance of the action.

7. A controlling device comprising:
a processor; and
a memory communicatively coupled to the processor and storing instructions, that, when executed by the processor, causes the processor to:
receive a voice input and one or more image inputs associated with a target device;
identify at least one feature of the target device and an action to be performed on the at least one feature, based on an intent and an object determined from the received voice input and the one or more image inputs;
determine a correspondence between the at least one feature and the action to be performed using a trained neural network, wherein the trained neural network is pre-trained based on a correspondence between a plurality of prior actions and a plurality of features associated with the target device, and wherein the trained neural network is pre-trained to correctly identify the at least one feature and the action by combining a loss function for recognition of the action and a loss function for recognition of the target device that is to perform the action;
compare a current operational state of the at least one feature with an operational threshold of the at least one feature, wherein the current operational state of the at least one feature is indicative of a health state of the target device;
when there is a variation in the health state of the target device,
update the one or more image inputs associated with the target device based on the variation,
identify an updated at least one feature of the target device based on the updated one or more image inputs, and
determine a correspondence between the updated at least one feature and the action to be performed using a trained neural network; and
perform the action on the at least one feature or the updated at least one feature based on the determined correspondence, when the current operational state is within limits of the operational threshold.

8. The controlling device of claim 7, wherein the instructions, when executed by the processor, further cause the processor to:
convert the received voice input to text; and
determine each of the intent and the object based on processing of the text by a Long Short Term Memory (LSTM) model.

9. The controlling device of claim 8, wherein the text is provided to the LSTM model in the form of sequence of words using word embeddings and the LSTM model is trained based on the prior actions, and each of the prior actions is associated with a probability of execution.

10. The controlling device of claim 7, wherein the instructions, when executed by the processor, further cause the processor to determine, from the one or more image inputs associated with the target device and by a convoluting neural network (CNN), the at least one feature of the target device, wherein the CNN is trained to identify features from the target device using at least one training image associated with the target device.

11. The controlling device of claim 10, wherein the one or more image inputs comprises at least one of a blueprint of the target device, a drawing of the target device, or a layout of the target device.

12. The controlling device of claim 7, wherein the instructions, when executed by the processor, further cause the processor to:
establish non-performance of the action on the at least one feature or the updated at least one feature, when the current operational state is outside the limits of the operational threshold; and
output an alert regarding the non-performance of the action, wherein the alert comprises details associated with the non-performance of the action.

13. A non-transitory computer-readable storage medium having stored thereon instructions for controlling devices through voice interaction comprising executable code which when executed by one or more processors, causes the one or more processors to:

receive a voice input and one or more image inputs associated with a target device;

identify at least one feature of the target device and an action to be performed on the at least one feature, based on an intent and an object determined from the received voice input and the one or more image inputs;

determine a correspondence between the at least one feature and the action to be performed using a trained neural network, wherein the trained neural network is pre-trained based on a correspondence between a plurality of prior actions and a plurality of features associated with the target device, and wherein the trained neural network is pre-trained to correctly identify the at least one feature and the action by combining a loss function for recognition of the action and a loss function for recognition of the target device that is to perform the action;

compare a current operational state of the at least one feature with an operational threshold of the at least one feature, wherein the current operational state of the at least one feature is indicative of a health state of the target device;

when there is a variation in the health state of the target device,
  update the one or more image inputs associated with the target device based on the variation,
  identify an updated at least one feature of the target device based on the updated one or more image inputs, and
  determine a correspondence between the updated at least one feature and the action to be performed using a trained neural network; and perform the action on the at least one feature or the updated at least one feature based on the determined correspondence, when the current operational state is within limits of the operational threshold.

14. The non-transitory computer-readable storage medium of claim 13, wherein the executable code, when executed by the one or more processors, further causes the one or more processors to:
  convert the received voice input to text; and
  determine each of the intent and the object based on processing of the text by a Long Short Term Memory (LSTM) model.

15. The non-transitory computer-readable storage medium of claim 14, wherein the text is provided to the LSTM model in the form of sequence of words using word embeddings and the LSTM model is trained based on the prior actions, and each of the prior actions is associated with a probability of execution.

16. The non-transitory computer-readable storage medium of claim 13, wherein the executable code, when executed by the one or more processors, further causes the one or more processors to determine, from the one or more image inputs associated with the target device and by a convoluting neural network (CNN), the at least one feature of the target device, wherein the CNN is trained to identify features from the target device using at least one training image associated with the target device.

17. The non-transitory computer-readable storage medium of claim 16, wherein the one or more image inputs comprises at least one of a blueprint of the target device, a drawing of the target device, or a layout of the target device.

18. The non-transitory computer-readable storage medium of claim 13, wherein the executable code, when executed by the one or more processors, further causes the one or more processors to:
  establish non-performance of the action on the at least one feature or the updated at least one feature, when the current operational state is outside the limits of the operational threshold; and
  output an alert regarding the non-performance of the action, wherein the alert comprises details associated with the non-performance of the action.

\* \* \* \* \*